Figure 1:
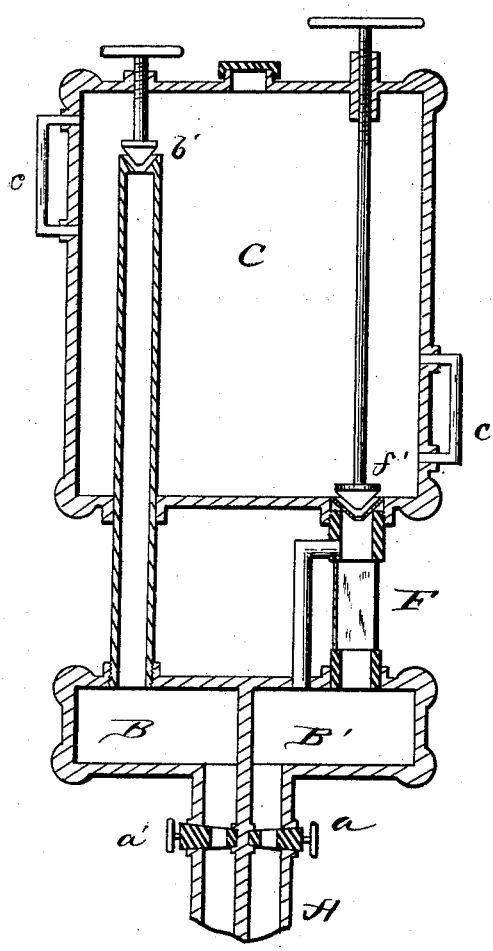

(No Model.)

S. G. CABELL.
LUBRICATOR.

No. 320,538. Patented June 23, 1885.

Witnesses
Wm A Rosenbaum
Geo W Morse

Inventor
Samuel G. Cabell
by V. D. Stockbridge
Attorney

UNITED STATES PATENT OFFICE.

SAMUEL G. CABELL, OF WASHINGTON, D. C., ASSIGNOR OF TWO-THIRDS TO ROBERT W. HANNA AND MILTON S. CABELL, OF QUINCY, ILL.

LUBRICATOR.

SPECIFICATION forming part of Letters Patent No. 320,538, dated June 23, 1885.

Application filed June 5, 1884. (No model.)

*To all whom it may concern:*

Be it known that I, SAMUEL G. CABELL, of the city of Washington, in the District of Columbia, a citizen of the United States, have invented certain new and useful Improvements in Lubricators for Steam-Engines, of which the following is a specification.

My invention relates to lubricators for steam machinery; and its principal object is to provide a lubricator or oil-cup which shall be simple in construction, and which shall feed either by gravity or by hydrostatic pressure resulting from the condensation of steam.

In the drawing, forming a part of this specification, I show a figure illustrating the form of lubricator which I prefer to use.

Referring to the accompanying figure, A represents a double pipe, each passage of which is provided with a stop-cock, $a\ a'$. This pipe is adapted to be attached to the steam-pipe of an engine.

At B B' is shown simply an enlargement of the pipe A, in shape like a hollow circular box, so as to preserve symmetry in the construction of the device. The diaphragm in pipe A is continued, and divides the enlarged chamber B B' as well.

Leading from B up into the oil-chamber C is a pipe, $b$, having a valved opening, $b'$, at the top.

The chamber B' is connected with the oil-receptacle by a passage or pipe, F, a portion of which is of glass. The upper end of this pipe is provided with a downwardly-projecting cone, $f$, the apex of which is open to form a "drip." Access to this drip is regulated by valve, $f'$.

$c\ c$ are tubes to indicate the amount of oil in vessel C.

The tank C being supplied with oil, and the cock $a'$ being closed, the valve $f'$ is opened a sufficient distance, and the oil feeds by gravity through the small opening in the cone $f$ and drips down through the passages F, B', and A into the steam-pipe, thence to the working-surfaces of the engine. The amount of the "dripping" or "feed" at any time may be observed through the glass portion of tube F, and regulated accordingly by the valve $f'$.

When it is desired to feed the lubricant by hydrostatic pressure, the valve $f'$ is closed and cock $a'$ opened, thus allowing steam to pass into the oil-receptacle, where it condenses and falls to the bottom and causes an overflow into pipe $b$, the amount of which may be regulated by the valve $b'$.

It should be observed that as the pipe $b$ extends nearly the entire length of the oil-chamber, the steam which enters and stands in it when the valve at the top is closed serves to heat the oil and prevent its freezing.

Having thus fully described my invention, I claim—

1. In a lubricator for engine-cylinders, the combination, with the oil-reservoir, of a valve located at the bottom thereof controlling a channel for allowing the oil to feed by gravity to the working parts of the engine, and a valve at or near the top controlling a steam-channel for admitting steam for condensation and affording a passage for the oil, whereby a convertible gravity and hydrostatic lubricator is secured.

2. In a lubricator for engine-cylinders, the combination, with the oil-reservoir C, of a valve, $f'$, located at the bottom thereof controlling a channel for allowing the oil to feed by gravity to the working parts of the engine, and a valve at or near the top controlling a steam-channel for admitting steam for condensation and affording a passage for the oil, and tubes $c\ c$ for indicating the amount of oil in the reservoir, all as set forth.

In testimony that I claim the foregoing I hereunto affix my signature in the presence of two witnesses.

SAMUEL G. CABELL.

Witnesses:
WM. A. ROSENBAUM,
HOWARD ZEVELY.